United States Patent Office 2,994,693
Patented Aug. 1, 1961

2,994,693
POLYMERIC AZO DYE
Norman Blake, Chadds Ford, Pa., and Harold Wayne Hill, Jr., Wilmington, Del., assignors to E. I. du Pont de Nemours and Company, Wilmington, Del., a corporation of Delaware
No Drawing. Filed June 29, 1956, Ser. No. 594,704
10 Claims. (Cl. 260—144)

This invention relates to a chemical compound. More specifically it is concerned with new and useful polymeric dyes having good solubility characteristics in common solvents.

It is an object of the present invention to produce a polymeric dye.

Another object is to produce a shaped article produced from a synthetic polymer and colored with a polymeric dye.

A further object is to produce a polymeric dye compatible with a synthetic linear fiber-forming polymer.

These and other objects will become apparent in the course of the following specification and claims.

The polymeric dyes of the present invention are useful in the preparation of wash-fast, lustrous, colored shaped objects produced from synthetic polymers of high molecular weight.

In accordance with the present invention a linear polymeric dye produced by a low temperature polymerization is provided, the said dye having the formula $$[-Z'-Z-X-Z-Z'-Y-]_n$$

wherein $n$ is an integer above 2, —X— is a divalent organic radical containing a chromophore group from the class consisting of azo, azine and anthraquinone, one of Z and Z' being

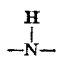

and the combination of —Z'—Z— forming a linkage of the class consisting of

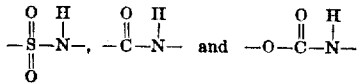

each —Z— being attached to a carbon of —X—, which carbon is a component of an aromatic ring, —Y— being a divalent organic radical from the class consisting of —X—, aromatic, cycloaliphatic and aliphatic containing 2 to 10 carbon atoms, with the proviso that when —X— is

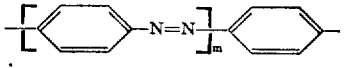

and —Y— is

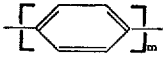

$m$ being an integer of at least 1, in at least one position of 2,3,5 and 6 upon at least one aromatic nucleus, a hydrogen is substituted by a radical from the class consisting of alkyl, alkyloxy and nitro.

The polymeric dyes of the present invention are made by reacting, under mild conditions, two or more complementary monomers, at least one of which is a dye, and all of which have two effective amide or urethane-forming groups comprising amino, haloformate, carboxylic acid halide or sulfonyl halide groups.

Any combination of dyes and intermediates can be used except the limited number of combinations of reactants which may be represented (devoid of linkage-forming groups) by the formula

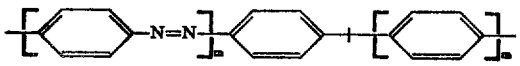

where $m$ is any integer 1 or larger. As will be apparent from the expression noted above, in combinations of this type all phenyl groups are connected in a p,p' relation, all linkage-forming groups are in a p,p' relation and in addition, neither reactant contains substituents for hydrogen in the 2, 3, 5 or 6 position of any benzene ring.

By the term "low temperature polymerization" is meant condensation polymerization with elimination of hydrogen halide, at a temperature not in excess of about 90° C. between diacid halides and diamines. Typical suitable diacid halides are dicarbonyl halides, disulfonic acid halides and dihaloformates. The reactions may be carried out in a homogeneous system using a single solvent or employing an interfacial polymerization technique which involves a heterogeneous system such as disclosed in United States Patent Nos. 2,667,468, 2,708,617.

The following examples are cited to illustrate the invention. They are not intended to limit it in any manner. As used in the examples the term "polymer melt temperature" is the minimum temperature at which a sample of the polymer leaves a wet, molten trail as it is stroked with moderate pressure across a smooth surface of a heated block. The "inherent viscosities" of the various polymers is determined in accordance with the formula:

$$\text{Inherent viscosity} = \frac{\ln \eta_r}{C}$$

wherein C is the concentration in grams of the polymer in 100 ml. of the solvent (½% by weight of polymer used in examples) and $\eta_r$ is the flow time of the solution of the polymer relative to the flow time of the solvent used at 25° C. In each example the reaction occurs at room temperature unless otherwise stated.

EXAMPLE I

A solution of 4.10 grams (0.036 mole) of trans-2,5-dimethylpiperazine and 6.36 grams (0.06 mole) of sodium carbonate in 250 ml. of water is placed in a Waring Blendor. An emulsion is formed by adding, with stirring, 75 ml. of methylene chloride. A turbid solution of 9.21 grams (0.03 mole) of p,p'-azodibenzoyl chloride, dull red in color, in 150 ml. of methylene chloride is then added to the previously formed emulsion in 1 to 2 seconds. The stirring is continued for 7 minutes and 300 ml. of hexane is added to precipitate the polymer. The product is separated by filtration, washed with 2 to 3 liters of water and finally with two 300 ml. portions of acetone in a Waring Blendor. After drying at 70° C. in vacuo, 8.6 grams (83% yield) of a bright orange colored polymer with an inherent viscosity of 2.19 in m-cresol is obtained. It is soluble in 98% formic acid, chloroform, chloroform/methanol azeotrope (88/12), chloroform/formic acid azeotrope (85/15), trichloroethylene/formic acid azeotrope (60/40), m-cresol and dimethylformamide/lithium chloride (95/5).

A 10% solution of the polymer in trichloroethane/formic acid (60/40) is prepared and a film cast from the solution. After air drying overnight, a tough, transparent, orange colored film is obtained. This film exhibits no change in color after 1300 hours' exposure in a Fade-O-Meter instrument (Atlas Electric Devices Co. of Chicago) and is still quite tough. A similar film of poly(dimethylpiperazine terephthalamide) degraded to a brittle condition under the same exposure in less than 100 hours. A quantitative determination of degradation can be made by measuring the inherent viscosity of the films after various periods of exposure. The comparative figures are reported in Table 1 below.

Table 1

|  | 0 hours | 28 hours | 79 hours | 85 hours | 1,000 hours |
| --- | --- | --- | --- | --- | --- |
| Polymeric dye film | 2.19 | (1) | (1) | 1.36 | 0.70 |
| Control | 2.90 | 1.18 | 0.59 | (1) | very brittle |

1 Not measured.

EXAMPLE II

A solution of 0.748 gram (.003 mole calculated as the half hydrochloride) of the yellow dye o,p-diaminoazobenzene (Color Index No. 20) in 150 ml. of water containing 0.95 gram (0.009 mole) of sodium carbonate is rapidly stirred in a Waring Blendor while 0.609 gram (0.003 mole) of terephthaloyl chloride in 75 ml. of methylene chloride is added over a period of 10 seconds. After 5 minutes of stirring, the methylene chloride is removed by evaporation on a steam bath. The polymer is separated by filtration, washed with two liters of hot water and dried in vacuo. A yield of 0.75 gram (75% of theoretical) of an orange-brown polymer with a polymer melt temperature of 330° C. and an inherent viscosity as measured in sulfuric acid of 0.21 is obtained. The polymer is soluble in dimethylformamide and m-cresol.

EXAMPLE III

The terephthaloyl chloride of Example II is replaced with an equivalent amount of sebacyl chloride. A 50% yield of yellow-brown polymer with a polymer melt temperature of 130° C. is obtained. The product is soluble in dimethylformamide and in m-cresol.

EXAMPLE IV

The o,p-diaminoazobenzene of Example II is replaced with a 2.4/97.6 molar mixture of o,p-diaminoazobenzene and dimethylpiperazine. A yellow polymeric product is obtained with a polymer melt temperature of 400° C. in an 89% yield. It is soluble in 98% formic acid, an 85/15 mixture of chloroform and formic acid, a 60/40 mixture of trichloroethane and formic acid and in m-cresol.

EXAMPLE V

A solution containing 7.0 grams of sodium carbonate and 4.3 grams of o,p-diaminoazobenzene dihydrochloride (0.015 mole) in 375 ml. of water is emulsified with 200 ml. of methylene chloride in a Waring Blendor. A solution of 3.42 grams (0.015 mole) of 2,2'-dimethylpropanediol bischloroformate in 100 ml. of $CH_2Cl_2$ is added rapidly (5 to 10 seconds). The two phase mixture is stirred for 20 minutes at the maximum speed and for an additional 15 minutes at half speed. The $CH_2Cl_2$ is removed on a steam bath by evaporation and the resulting aqueous mixture is filtered. The residue is washed with water until the wash water is free of color and dried in a vacuum oven. A 78% yield of a yellow polymer with a polymer melt temperature of 140° C. is obtained. The polymer is soluble in all the solvents in which the polymer of Example I is reported as soluble as well as in dimethylformamide, acetone, methylene chloride, dimethylsulfoxide, dimethylacetamide, ethylene carbonate, gamma-butyrolactone and tetramethylene sulfone.

Two solutions, each containing 14% by weight of polyacrylonitrile in dimethylformamide, are prepared. To one is added 1% of the polymeric dye of the example. To the other, 1% of o,p-diaminoazobenzene is added. A film is cast from each solution, dried at 100° C. for 3 hours and then boiled in 14% aqueous dimethylformamide solutions for 30 minutes. The film colored with o,p-diaminoazobenzene bleeds badly and gives a highly colored extract. The film containing the polymeric dye of the example does not bleed at all and the extracting solution is colorless. An ebullioscopic determination, carried out on a solution of the polymeric dye in ethylene chloride shows its absolute number average molecular weight values are 1850, 1850 and 1950. These values represent the minimum average age since the method is relatively insensitive to any high moleclular weight species present. Since the recurring unit from the dye and the bischloroformate has a molecular weight of 369, this indicates a degree of polymerization somewhat greater than 5. A solution of this polymer has an inherent viscosity of 0.08 in dimethylformamide.

EXAMPLE VI

A solution of 1.24 grams (0.005 mole calculated as the half hydrochloride) of o,p-diaminoazobenzene in 150 ml. of water is rapidly stirred in a Waring Blendor while a solution of 1.56 grams of sodium carbonate in a mixture of 50 ml. of water and 50 ml. of methylene chloride is added. To the emulsion so formed, 1.35 grams (0.005 mole) of m-phenylene disulfonyl chloride is added with stirring. The colored polymer is filtered, washed with hot water and dried. It is soluble in dimethylformamide and has an inherent viscosity of 0.06 in that solvent.

EXAMPLE VII

A solution containing 1.2 grams of sodium carbonate and 0.1 gram of sodium lauryl sulfate in 200 ml. of water is emulsified in a Waring Blendor with a solution of 1.34 grams (0.005 mole) of a magenta colored dye, 1,4-diamino-2-methoxy anthraquinone, in 200 ml. of methylene chloride. A solution containing 1.14 grams (0.005 mole) of 2,2'-dimethylpropanediol bischloroformate in 100 ml. of methylene chloride is added to the stirred emulsion over a period of 1 to 2 seconds. Stirring is continued at the maximum blending speed for 10 minutes and for an additional 15 minutes at half speed. Methylene chloride is thereafter removed by evaporation on a steam bath. The resulting aqueous mixture is filtered and the residue is washed with water until the wash water is free of color. A 61% yield of a brick-red colored polymer, soluble in dimethylformamide, methylene chloride, dimethylacetamide, ethylene carbonate, gamma-butyrolactone, tetramethylene sulfone and dimethyl sulfoxide is obtained. Ebullioscopic determinations on a solution of the polymer in ethylene chloride indicates absolute molecular weight values of 1650 and 1750. Since the recurring unit in the polymer has a molecular weight of 397, the degree of polymerization is about 4 to 5. The inherent viscosity of the polymer measured in dimethylformamide is 0.06.

A film of polyacrylonitrile containing 1% of the polymeric dye of this example is fast to a 30-minute extraction at the boil of a 14% aqueous dimethylformamide solution. The same treatment on a film containing the monomeric dye extracts the dye.

EXAMPLE VIII

The procedure of Example V is followed to react p,p'-diaminoazobenzene with pentaglycol bischloroformate. Benzene and water are employed to form an emulsion of the dye-containing acid acceptor. The bischloroformate is added from a benzene solution. A 77% yield of a yellow polymer is obtained having a polymer melt temperature of 311° C. which polymer is soluble in dimethylformamide, m-cresol, acetone, a mixture of dimethylformamide and lithium chloride (95/5 by weight), methylene chloride, dimethylsulfoxide, dimethyl acetamide, gamma-butyrolactone, ethylene carbonate and tetramethylene sulfone. A standard test film of polyacrylonitrile containing 1% by weight polymeric dye of the example is formed. The standard film preparation involves adding the polymeric dye to dimethylformamide containing 14% by weight of polyacrylonitrile, casting a film therefrom which is subsequently dried for 3 hours at 100° C. The standard test film is subjected to a 30-minute extraction with a 14% aqueous dimethylformamide solution at the boil. No color is extracted from the standard film, containing the polymeric dye. A comparative control film incorporating 1% p,p'-diaminoazobenzene as dye causes extensive coloration of the extracting fluid.

EXAMPLE IX

The reactants of Example VIII are combined in a homogeneous system, i.e., using dichloromethane as the sole reaction medium by combining, at room temeprature and in a Waring Blendor running at about half speed, a solution of 0.810 gram (0.004 mole) of p,p'-diaminoazobenzene and 0.840 gram (0.008 mole) of triethylamine acid acceptor in 400 ml. of dichloromethane and a solution of 0.92 gram (0.004 mole) of pentaglycol bischloroformate in 100 ml. of dichloromethane. After 10 minutes' stirring, the product is precipitated by addition of about one liter of hexane, recovered by filtration, washed with water and dried. The air-dried polymer, obtained in good yield, is ruddy-brown in color and is yellow in dilute solutions and brown in concentrated solutions. No bleeding of the polymeric dye from the standard test film is noted on 30 minutes' extraction with 14% aqueous dimethylformamide solution at the boil.

EXAMPLE X

The technique of Example V is employed to polymerize p,p'-diaminoazobenzene with ethylene glycol bischloroformate using benzene and water to form the emulsion of the diamine with the acid acceptor (sodium carbonate) and adding the ethylene glycol bischloroformate from a benzene solution. A yellow polymeric dye is produced having a polymer melt temperature of 366° C. It is soluble in dimethylformamide. No dye extraction is noted when a standard test film incorporating the polymeric dye of this example is subjected to the 30-minute extraction with 14% aqueous dimethylformamide at the boil.

EXAMPLE XI

The procedure of Example II is followed to polymerize p,p'-diaminoazobenzene with 3-methyl adipyl chloride. Dichloromethane and water are employed to form the emulsion of the diamine and the sodium carbonate acid acceptor. The 3-methyl adipyl chloride is added from a dichloromethane solution. An 86% yield of a yellow polymer having a polymer melt temperature above 400° C. and soluble in dimethylformamide is obtained. No bleeding of the polymeric dye is observed upon subjecting the standard test film of the dye to 30 minutes extraction with a 14% aqueous dimethylformamide solution at the boil.

EXAMPLE XII

The procedure of Example II is followed to polymerize p,p'-diaminoazobenzene with adipyl chloride. Dichloromethane and water are employed to form the emulsion of the diamine and the sodium carbonate acid acceptor. The adipyl chloride is added from a dichloromethane solution. A 63% yield of a yellow polymer having a melt temperature above 400° C. which is soluble in dimethylformamide is obtained. A test film incorporating the polymeric dye product resists extraction at the boil over a 30-minute period.

EXAMPLE XIII

The technique of Example IX is employed to react pentaglycol bischloroformate with the dye having the formula

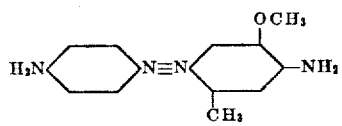

Chloroform is used as the reaction medium. Trimethylamine is used as the acid acceptor. A red-brown polymeric dye is obtained in a 63% yield. It has a polymeric melt temperature of 125° C. and is soluble in 98% formic acid, m-cresol and the 60/40 azeotrope of trichloroethylene/formic acid. When the dye is incorporated in a test film of poly(dimethylpiperazine terephthalamide) cast from a formic acid solution it resists extraction with 14% aqueous formic acid for 30 minutes at the boil.

EXAMPLE XIV

The technique of Example XIII is followed to react pentaglycol bischloroformate with a diamine having the formula

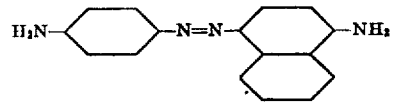

using acetone as a solvent with triethylamine as acid acceptor. The polymeric dye produced in an 81% yield is black, and is soluble in 98% formic acid. A test film of poly(dimethylpiperazine terephthalamide) cast from formic acid resists extraction with 14% aqueous formic acid for 30 minutes at the boil.

EXAMPLE XV

The technique of Example V is employed in the reaction of pentaglycol bischloroformate with a dye having the formula

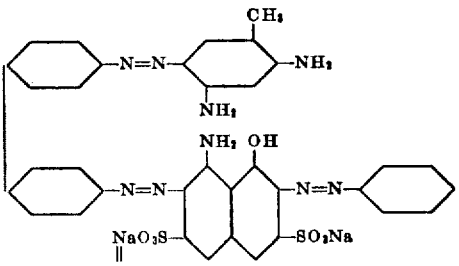

A mixture of 2 volumes of dimethylformamide and 1 volume of water is employed to dissolve the dye. Benzene is employed to dissolve the pentaglycol bischloroformate. Sodium carbonate in water is employed as acid acceptor and in forming ar emulsion. The product is obtained in a 90% yield. It is black and is soluble in dimethylformamide. When a standard test film incorporates this dye, the dye resists extraction with 14% aqueous dimethylformamide for 30 minutes at the boil.

EXAMPLE XVI

A polyamide is produced by the reaction of the dye of Example XV with oxalyl chloride employing dichloromethane as a solvent and triethylamide as acid acceptor. The product which is black is soluble in dimethylformamide and when incorporated in a standard test film of polyacrylonitrile shows no evidence of extraction when treated with 14% aqueous dimethylformamide at the boil for 30 minutes.

EXAMPLE XVII

Example XVI is repeated substituting adipyl chloride for oxalyl chloride. The product is noted to have the physical characteristics of the product of Example XVI.

EXAMPLE XVIII

The procedure of Example IX is followed substituting a dye having the formula

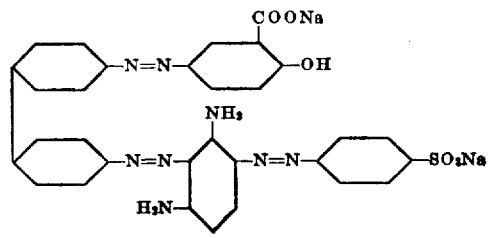

for the p,p'-diaminoazobenzene. The polymeric dye obtained is brown in color, has a polymer melt temperature of 246° C., is soluble in dimethylformamide and when incorporated in a standard polyacrylonitrile test film resists extraction with 14% aqueous dimethylformamide solution at the boil for 30 minutes.

EXAMPLE XIX

The procedure of Example XVIII is repeated substituting the dye having the formula

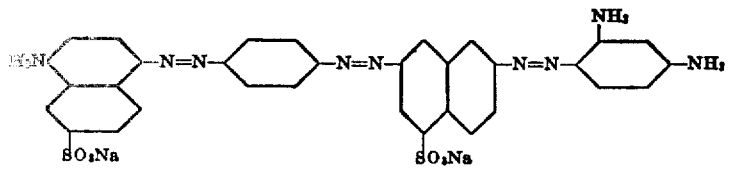

for the dye of Example XVIII. The product is obtained in 85% yield. It is black, is soluble in dimethylformamide and resists extraction with 14% aqueous dimethylformamide solution at the boil for 30 minutes when incorporated in a standard polyacrylonitrile test film.

EXAMPLE XX

Pentaglycol bischloroformate is reacted with 1,4-diamino anthraquinone. Methylene chloride is employed as a solvent for each reactant. Sodium carbonate in an aqueous solution is added as acid acceptor. The product is yellowish brown in color, is obtained in a 70% yield, has an inherent viscosity of 0.06, a polymer melt temperature of 268° C. and is soluble in all of the solvents listed for Example V. Its test film in polyacrylonitrile resists extraction with a 14% aqueous dimethylformamide solution at the boil for 30 minutes.

EXAMPLE XXI

A polyamide is produced from terephthaloyl chloride and 1,4-diamino anthraquinone. o-Dichlorobenzene is employed as the reaction medium and triethylamine is used as acid acceptor. The product is obtained in a 79% yield, has an inherent viscosity of 0.06, a deep red purple color and a polymer melt temperature of 275° C. It is soluble in a dimethylformamide/lithium chloride mixture (95/5 by weight).

Its standard test film of acrylonitrile shows no extraction with a 14% aqueous dimethylformamide solution at the boil for 30 minutes.

EXAMPLE XXII

Adipyl chloride is reacted with 1,4-bis(2-hydroxyethylamine)anthraquinone. Benzene is employed as a solvent for the adipyl chloride and a mixture of benzene with dimethylformamide is used to dissolve the dye. Sodium carbonate in an aqueous solution is used as acid acceptor. The product is blue. It is obtained in a 48% yield. It is soluble in dimethylformamide and acetone. The standard test film of acrylonitrile resists extraction with a 14% aqueous dimethylformamide solution at the boil for 30 minutes.

EXAMPLE XXIII

Sebacyl chloride is reacted with a 60/40 mixture of the dye of Example XXII/dimethyl piperazine. Methylene chloride is used as a solvent for the dye and dimethylformamide is used as solvent for the sebacyl chloride and acid acceptor. The polymeric dye product is blue in color and is soluble in dimethylformamide. It is obtained in a 75% yield. Upon extraction with a 14% aqueous dimethylformamide solution for 30 minutes at the boil no evidence of dye leaching is observed.

EXAMPLE XXIV

Acetone is employed as a reaction medium with triethylamine as acid acceptor in the reaction of pentaglycol bischloroformate with 1,5-diamino-4,8-dihydroxy anthraquinone. A blue polymeric product is obtained in a 69% yield. It has a polymer melt temperature of 351° C. and is soluble in dimethylformamide. No evidence of dye extraction is noted upon treatment for 30 minutes at the boil with a 14% aqueous dimethylformamide solution of the standard test film incorporating the dye.

EXAMPLE XXV

Terephthaloyl chloride is reacted with a mixture of dimethyl piperazine and a dye of the formula

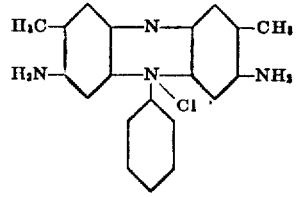

in a molar ratio of 0.024/0.976 (dye/dimethyl piperazine). Chloroform is employed as a solvent for the acid chloride and water for the sodium carbonate acid acceptor and amine reactant. A blue polymeric product having an inherent viscosity of 1.21 and a polymer melt temperature of 400° C. is obtained. It is soluble in 98% formic acid, m-cresol, 85/15 azeotrope of chloroform/formic acid and the 60/40 azeotrope of trichloroethylene/formic acid.

EXAMPLE XXVI

The dye, the structural formula of which is illustrated in Example XXV, is reacted in an interphase polymerization with pentaglycol bischloroformate. Water is employed as the solvent for the dye and the sodium carbonate acid acceptor. Dichloromethane is employed as a solvent for the pentaglycol bischloroformate. A brown polymeric dye is obtained in an 89% yield. It has an inherent viscosity of 0.10, a high polymer melt temperature and it is soluble in 98% formic acid, dimethylformamide, m-cresol, acetone and the azeotropes of chloroform/methanol (88/12), chloroform/formic acid (85/15) and trichloroethylene/formic acid (60/40). No evidence of dye extraction is noted when the standard test film incorporating the dye is subjected to a 14% aqueous dimethylformamide solution at the boil for 30 minutes. Dye extraction does occur when using the monomeric dye of this example as well as when using the monomeric dyes of each of the examples herein, in the preparation of colored test films.

The following examples illustrate typical yarn preparations employing several of the above identified polymeric dyes. The cellulose acetate yarns are spun from an acetone solution containing 25% solids and from 0.5 to 2.0% (based on total solids) of the polymeric dye as indicated in each example. These yarns are prepared by extruding the solutions maintained at 70° C. through a 24-hole spinneret, the orifices having a diameter of 0.005 in., into a 120° C. air column. The yarn is wound up at a rate of 240 yards per minute. Knitted tubes are prepared from this yarn for light and wash fastness determinations.

The polyacrylonitrile fibers are spun from a 23% solids content of which the polymeric dye represents from 0.5% to 2.0% of the total solids as indicated in each example. The spinning solutions at 125° C. are extruded through a 30-hole spinneret, having an orifice diameter of 0.005 in., into an 185° C. air column. The yarn is collected at a rate of 150 yards per minute.

All the yarns containing polymeric dyes are found to be fast to dry cleaning, i.e. no bleeding of color is observed upon repeated immersion in typical dry cleaning agents such as Stoddard's Solvent and "Perchloroethylene." Furthermore, all yarns containing polymeric dyes are observed to be highly lustrous. Resistance to pressure washing is determined by extracting the as-spun yarns with a circulating 1% aqueous dimethylformamide solution at 105° C. under a pressure between about 10 and 25 pounds per square inch for 1 hour. The evaluation of the wash fastness is based upon observations of the color of the wash liquor. Light fastness data reported is in terms of the hours of exposure in a Fade-O-Meter (Model FDA-R, manufactured by Atlas Electric Device Company of Chicago) required to cause a visible difference in shade between the exposed portion and the original color. Wash-fastness tests are made by subjecting the cellulose acetate knitted tube to washing in an agitation type portable washing machine at various temperatures, in the presence of soap, sodium carbonate and available chlorine which is equivalent to the AATCC standards (Yearbook 31, pp. 56, 57, 1955), until a three-shade lighter color difference between the washed and unwashed sample is observed. A sample with a wash-fast rating of 4 or over withstands a washing at 182° F. or over. A wash-fastness rating of 1 indicates a three-shade color break at 105° C. A 150 minute washing period is used in ratings below 4. Ratings of 4 and above employ 225 minute periods.

EXAMPLE XXVII

A polyacrylonitrile fiber is prepared containing 1% of the polymeric dye of Example VIII. The yarn is yellow in color. It has a light-fastness rating of 42 hours and the dye shows excellent resistance to pressure washing. A comparative control containing 1% of the corresponding monomeric dye has a light-fastness rating of only 4 hours. The dye of the comparative control has a resistance to pressure washing rating of fair.

A cellulose acetate fiber containing 1.5% of the same polymeric dye is prepared. It is yellow in color and has a light-fastness rating of 200 hours. It has a wash-fastness rating of 5. A comparative control sample containing 1.5% of the corresponding monomeric dye has a wash-fastness rating of 1.

EXAMPLE XXVIII

A polyacrylonitrile fiber is prepared containing 0.5% of the polymeric dye of Example VII. The yarn is coral red in color. It has a light-fastness of 200 hours and the dye shows excellent resistance to pressure washing. A comparative control containing 0.5% of the monomeric dye has a light-fastness rating of only 15 hours. The dye of the comparative control has a resistance to pressure washing rating of fair.

A cellulose acetate fiber containing 0.5% of the same polymeric dye is prepared. A minor amount (i.e., about 4%) of dimethylformamide is added to the spinning solution to increase solubility. The fiber is coral red in color. It has a light-fastness rating of greater than 130 hours and a wash-fastness rating of 5. A comparative control sample containing 0.5% of the monomeric dye has a light-fastness rating of only 68 and a wash-fastness rating of 1.

EXAMPLE XXIX

A polyacrylonitrile fiber is prepared containing 1.0% of the polymeric dye of Example XV. The yarn is black in color. It has a light-fastness rating of 42 hours and the dye shows excellent resistance to pressure washing. A comparative control containing 1.0% of the monomeric dye has light-fastness rating of only 9 hours. The dye of the comparative control has a resistance to pressure washing rating of good.

A cellulose acetate fiber containing 2.0% of the acetone-soluble fraction of the above identified polymeric dye is prepared. A minor amount of dimethylformamide is added to the spinning solution to increase solubility of the dye. The fiber is black in color and has a light-fastness rating of 20 hours and a wash-fastness rating of 5. A comparative control sample containing 2.0% of the corresponding monomeric dye has a light-fastness rating of 5 hours.

EXAMPLE XXX

A polyacrylonitrile fiber is prepared containing 0.5% of the polymeric dye of Example XX. The yarn is light brown in color. It has a light-fastness rating of 50 hours. A comparative control containing 0.5% of the corresponding monomeric dye has a light-fastness rating of 40 hours.

EXAMPLE XXXI

A cellulose acetate fiber containing 0.5% of the polymeric dye of Example XXII is prepared. A minor amount of dimethylformamide is added to the spinning solution to assist solubility of the dye. The yarn is blue in color. It has a light-fastness rating of 60 hours. A comparative control sample containing 0.5% of the corresponding monomeric dye has a light-fastness rating of only 25 hours.

EXAMPLE XXXII

A polyacrylonitrile fiber is prepared containing 0.5% of the polymeric dye of Example XXIII. The yarn is blue in color. It has a light-fastness rating of 12 hours. A comparative control containing 0.5% of the corresponding monomeric dye has a light-fastness rating of only 5 hours.

A cellulose acetate fiber containing 0.5% of the same polymeric dye is prepared. The yarn is blue in color and has a light-fastness rating of 70 hours. A comparative control sample containing 0.5% of the corresponding monomeric dye has a light-fastness rating of 25 hours.

EXAMPLE XXXIII

A polyacrylonitrile fiber is prepared containing 0.5% of the polymeric dye of Example XXIV. The yarn is blue in color. The dye shows excellent resistance to pressure washing. A comparative control containing 0.5% of the corresponding monomeric dye shows only fair resistance of the dye to pressure washing.

EXAMPLE XXXIV

A polyacrylonitrile fiber is prepared containing 0.5% of the polymeric dye of Example XXVI. The yarn is brown in color. It has a light-fastness rating of 9 hours. A comparative control containing 0.5% of the corresponding monomeric dye has a light-fastness rating of only 1.

EXAMPLE XXXV

A polyacrylonitrile fiber is prepared containing 2.0% of the polymeric dye of Example V. The yarn is yellow in color. The dye shows excellent resistance to pressure washing. A comparative control containing 1.3% of the corresponding monomeric dye has only a poor resistance of dye to pressure washing.

A cellulose acetate fiber containing 1.8% of the same polymeric dye is prepared. The yarn is yellow in color. It has a light-fastness rating of 90 hours and a wash-fastness rating of about 5. A comparative control containing only the corresponding monomeric dye has a light-fastness rating of 19 hours and a wash-fastness rating of 1.

As is evident from the examples the polymeric dyes of the present invention may be conveniently made by low temperature polymerization of a diamine of the formula

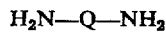

with a compound from the class consisting of

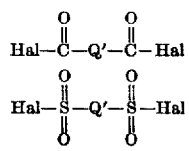

and

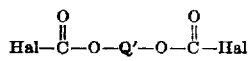

wherein Hal— represents a halogen, preferably chlorine and bromine and —Q— and —Q'— are different members of the class of —Y— and —X— as previously defined. At least one of the radicals —Q— and —Q'— contains a chromophore grouping from the class consisting of azo, azine and anthraquinone. The nature of the dye is not critical. The complementary reactant may be another dye containing two reactive groups complementary to those of the first dye or an organic compound containing two reactive groups complementary to those of the dye from the class consisting of an aromatic, aliphatic containing 2 to 10 carbon atoms and cycloaliphatic. Mixtures of either or both classes of complementary reactants may be used. The combination of complementary dyes by this technique offers a novel approach to the production of new colors by combination of existing dyes. While many combinations of difunctional dyes with complementary difunctional organic compounds are illustrated in the specific examples, many other combinations are possible as will be obvious to those skilled in the art. For instance, the diamine dye used to prepare the polymeric dye of Example XXVI (Color Index Number 841) may be reacted with such diverse complementary difunctional organic compounds as (A) The bishaloformates of the alkylene glycols such as ethylene, propylene or butylene glycol bisbromoformates, ethylene, propylene or butylene glycol bischloroformates, and the like;

(B) The diacid halides of dibasic aliphatic acids such as the acid chlorides and bromides of malonic, glutaric, adipic, pimelic, suberic, azelaic, sebacic acids and the like;

(C) The diacid halides of dibasic cyclic acids such as the acid chlorides and bromides of phthalic, isophthalic, terephthalic, hexahydroterephthalic, bibenzoic, p-methylene bisbenzoic, p-ethylene bisbenzoic acids and the like;

(D) Bis-sulfonyl halides such as tetramethylene bissulfonyl chloride, methane bis-sulfonyl chloride, hexamethylene-1,6-disulfonyl chloride, decamethylene-1,10-bis-sulfonyl chloride, cyclohexane-1,4-bis-sulfonyl chloride, benzene-1,3-bis-sulfonyl chloride, 3-oxapentane-1,5-bis-sulfonyl chloride and the like. The soluble products of this invention can be made from dyes containing more than two amino groups if the reactivity of each of two of the groups is appreciably greater than the others and if a stoichiometric amount of a coreactant is used. This principle is demonstrated in Example XVII where the dye contains two amino groups of equivalent reactivity and a third of lower reactivity due to the presence of a sulfonate group on the same ring with the latter amino group. The use of mild polymerization conditions and a stoichiometric amount of a bis-chloroformate produces a soluble polymer. It will be apparent that polymers can be made from intermediates having only two amide or urethane forming groups of different reactivities if the polymerization conditions are made stringent enough to cause a lesser reactive group to take part, as for example by a use of higher temperatures or longer polymerization times.

The reaction of phenolic groups is apparently so slow under the mild conditions of these polymerizations with acid chlorides or bis-chloroformates that they can be considered as inert. For example, when the diamino anthraquinone of Example VII is replaced with a 1-amino, 4-hydroxy anthraquinone, no polymer is produced under the reaction conditions of the example. The phenolic groups present in the dyes of Examples XV to XVIII and XXIV are also unreactive under the conditions used and thus soluble polymers result. Illustrative of diamines suitable for reaction with, for instance, a diacid halide dye, such as p,p'-azodibenzoyl chloride of Example I, may be mentioned ethylene diamine, hexamethylene diamine, m,m'-diaminoazobenzene, 1,4-diaminoanthraquinone, 1,4-diaminonaphthalene, 1,3-diaminobenzene, 1,4-diaminocyclohexane, m,m'-bibenzyldiamine and the like. Copolymers may be made by using mixtures of one or both of the reactants as defined above.

As previously pointed out, when —X— is

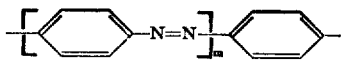

and —Y— is

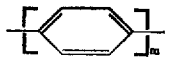

$m$ being an integer of at least 1, in at least one position of 2, 3, 5 and 6, upon at least one aromatic nucleus, a hydrogen is substituted by a radical from the class consisting of alkyl, alkyloxy and nitro. The unsubstituted products are highly insoluble and not suitable for coloring shaped structures of linear synthetic polymers.

The reactants as defined above, suitable for forming the products of the present invention, are reacted at low temperature in the presence of a diluent and an acid acceptor. The reaction is conveniently performed at room temperature. Temperatures above about 90° C. are usually to be avoided. Lower temperatures, as low as 0° C., are at times useful where the reactants are of a high order of reactivity. Many of the polymeric dyes can be made in a homogeneous reaction system where both reactants are soluble in a common solvent. Such a technique is illustrated in the specific examples among which is Example IX. In this type of polymerization, i.e. "solution polymerization," the reactants are present in a single phase. Preferably at least one diluent is used in which both reactants are soluble or two or more different diluents that are miscible with each other and the reactants are used. The polymerization is usually complete at room temperature in less than 10 minutes. If the polymer is insoluble in the reaction mixture it is recovered by filtration. If the polymer is soluble in the reaction mixture it may be recovered by adding a liquid which is compatible with the reaction liquid but which has no solvent effect on the polymer. A useful modification of the solution polymerization technique is one in which water is present as a continuous phase while an inert water-immiscible liquid, which is a solvent for each polymer reactant forms a dispersed phase. Benzene, nitrobenzene, methylene chloride and chloroform are typical inert water-immiscible solvents satisfactory in their role of dispersed liquids. In general the water-immiscible phase will constitute about 40 to about 60% of the reaction media. A dispersing agent may be advantageously used in attaining a high degree of dispersion. The reaction usually proceeds well at room temperature and reaches a satisfactory degree of polymerization in less than 10 minutes. A polymer may be precipitated by distilling off the organic phase of the reaction media or by the addition of an organic solvent in which the polymer is not soluble.

Frequently interfacial polymerization is advantageous in producing materials of high molecular weight. In an interfacial polymerization the reactants are brought together in such a way that the reaction zone is at or immediately adjacent to a liquid-liquid interface and most of the molecules of at least one of the reactants must diffuse through liquid diluent to arrive at the reaction zone. This result is obtained by providing two liquid phases, one to contain the diamine, the other, the diacid halide or glycol bishaloformate, and at least one of the phases includes a liquid diluent. Preferably a reactant is a liquid under the reaction conditions or is dissolved in a diluent, but one of the reactants may be a finely divided solid, dispersed in a diluent in which the reactant is at least partially soluble. The polymerization is usually complete at room temperature in 10 minutes or less.

Since the polymerization reaction occurs with elimination of hydrogen halide it is preferable that it be performed in the presence of an acid acceptor. Excess amine may be used for this purpose. In solution polymerizations it is preferred that an inert tertiary amine such as triethylamine be used for this purpose. Where an aqueous phase is present in the reaction, such as occurs in most interfacial systems, alkali hydroxide or carbonate added to the aqueous phase is usually more convenient.

Although this invention has been illustrated using dyes of the class azo, anthraquinone, and azine, it is not limited thereto. The only limitations are that the dye contain two amide, sulfonamide or urethane-forming groups as taught in these specifications so that other classes of dyes regardless of their chromophoric structure can be used, such as thiazols, diphenylmethanes, triphenylmethanes, xanthenes, acridines, to name a few as described for example in "The Chemistry of Synthetic Dyes," by Venkataraman, published by Academic Press Inc., New York.

Instead of amino groups the dye can also contain two carboxylic acid halides, two sulfonic acid halides or two haloformate groups. Although the deepest colored polymers of this invention are homopolymers, copolymers can be made by replacing a portion of the dye with the equivalent amount of a compound having the same polymerizable groups as the dye when desired to modify the solubility and/or compatibility of the polymeric dye. Such copolymers can be used as coloring agents or for the fabrication of articles with or without another polymer. Also a mixture of co-reactants can be reacted with the dye molecule to form a copolymer.

The polymeric dyes described herein can be used in solutions of all manner of soluble polymers as for example, vinyl polymers and copolymers from acrylonitrile, vinyl acetate, vinyl chloride, and methyl acrylate to name a few, condensation polymers such as polyamides, polyurethanes, polyureas and polyesters, and cellulose derivatives such as the esters of acetic, propionic and butyric acids.

The polymeric dyes of this invention are advantageous in that they can be readily made in a complete range of colors, that are light fast and are soluble in organic solvents useful for dissolving linear synthetic polymers and so can be incorporated in polymeric solutions to be used for forming shaped articles such as in the spinning of filaments, casting of films, and the forming of coatings. When incorporated in a polymeric substrate consisting of other polymers or the polymeric dye itself, the colors of the product are extremely fast to laundering and fast to solvents that will not dissolve the polymeric object.

Many modifications will be apparent to those skilled in the art from a reading of the above without a departure from the inventive concept.

What is claimed is:

1. A polymeric dye having the formula

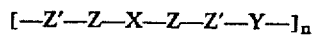

wherein $n$ is an integer from 3–5, —X— is a divalent organic radical containing a chromophore group from the class consisting of azo aromatic, azine aromatic, and anthraquinone radicals, one of Z and Z' being

and the combination of —Z'—Z— forming a linkage of the class consisting of

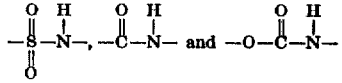

each —Z— being attached to a carbon of —X—, which carbon is a component of an aromatic carbocyclic ring, —Y— being a divalent organic radical from the class consisting of —X—, aromatic, cycloaliphatic and aliphatic containing 2 to 10 carbon atoms, with the proviso that when —X— is

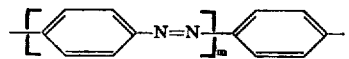

and —Y— is

$m$ being an integer of at least 1, in at least one position of 2, 3, 5 and 6 upon at least one aromatic nucleus, a hydrogen is substituted by a radical from the class consisting of alkyl, alkyloxy and nitro.

2. A dye having the formula

[—Z'—Z—X—Z—Z'—Y—]$_n$ wherein $n$ is an integer from 3–5, —X— is a divalent azo aromatic radical, one of Z and Z' being

and the combination of —Z'—Z— forming a linkage of the class consisting of

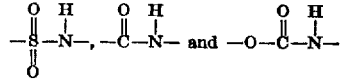

each —Z— being attached to a carbon of —X—, which carbon is a component of an aromatic carbocyclic ring, —Y— being a divalent organic radical from the class consisting of —X—, aromatic, cycloaliphatic and aliphatic containing 2 to 10 carbon atoms, with the proviso that when —X— is

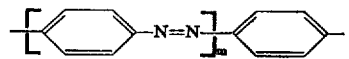

and —Y— is

$m$ being an integer of at least 1, in at least one position of 2, 3, 5 and 6 upon at least one aromatic nucleus, a hydrogen is substituted by a radical from the class consisting of alkyl, alkyloxy and nitro.

3. A dye having a unit of the formula

[—Z'—Z—X—Z—Z'—Y—]$_n$ wherein $n$ is an integer from 3–5, —X— is a divalent azine aromatic radical, one of Z and Z' being

and the combination of —Z'—Z— forming a linkage of the class consisting of

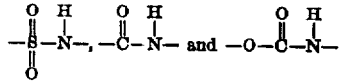

each —Z— being attached to a carbon of —X—, which carbon is a component of an aromatic carbocyclic ring, —Y— being a divalent organic radical from the class consisting of —X—, aromatic, cycloaliphatic and aliphatic containing 2 to 10 carbon atoms.

4. A dye having a unit of the formula

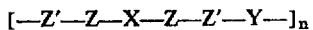

wherein $n$ is an integer from 3–5, —X— is a divalent anthraquinone radical, one of Z and Z' being

and the combination of —Z'—Z— forming a linkage of the class consisting of

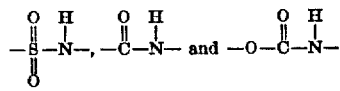

each —Z— being attached to a carbon of —X—, which carbon is a component of an aromatic carbocyclic ring, —Y— being a divalent organic radical from the class consisting of —X—, aromatic, cycloaliphatic and aliphatic containing 2 to 10 carbon atoms.

5. A dye having the formula

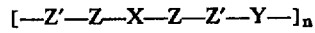

wherein $n$ is an integer from 3–5, —X— is a divalent organic radical containing a chromophore group from the class consisting of azo aromatic, azine aromatic, and anthraquinone radicals, one of Z and Z' being

and the combination of —Z'—Z— forming a sulfonamide linkage, each —Z— being attached to a carbon of —X—, which carbon is a component of an aromatic ring, —Y— being a divalent organic radical from the class consisting of —X—, aromatic carbocyclic, cycloaliphatic and aliphatic containing 2 to 10 carbon atoms, with the proviso that when —X— is

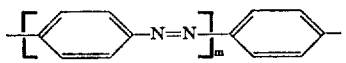

and —Y— is

$m$ being an integer of at least 1, in at least one position of 2, 3, 5 and 6 upon at least one aromatic nucleus, a hydrogen is substituted by a radical from the class consisting of alkyl, alkyloxy and nitro.

6. A dye having the formula

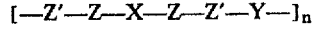

wherein n is an integer from 3–5, —X— is a divalent organic radical containing a chromophore group from the class consisting of azo aromatic, azine aromatic, and anthraquinone radicals, one of Z and Z' being

and the combination of —Z'—Z— forming a carbonamide linkage, each —Z— being attached to a carbon of —X—, which carbon is a component of an aromatic carbocyclic ring, —Y— being a divalent organic radical from the class consisting of —X—, aromatic, cycloaliphatic and aliphatic containing 2 to 10 carbon atoms, with the proviso that when —X— is

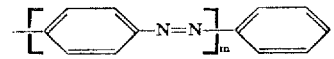

and —Y— is

$m$ being an integer of at least 1, in at least one position of 2, 3, 5 and 6 upon at least one aromatic nucleus, a hydrogen is substituted by a radical from the class consisting of alkyl, alkyloxy and nitro.

7. A dye having the formula

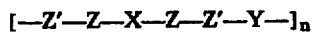

wherein $n$ is an integer from 3–5, —X— is a divalent organic radical containing a chromophore group from the class consisting of azo aromatic, azine aromatic, and anthraquinone radicals, one of Z and Z' being

and the combination of —Z'—Z— forming a urethane linkage, each —Z— being attached to a carbon of —X—, which carbon is a component of an aromatic carbocyclic ring, —Y— being a divalent organic radical from the class consisting of —X—, aromatic, cycloaliphatic and aliphatic containing 2 to 10 carbon atoms, with the proviso that when —X— is

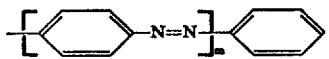

and —Y— is

$m$ being an integer of at least 1, in at least one position of 2, 3, 5 and 6 upon at least one aromatic nucleus, a hydrogen is substituted by a radical from the class consisting of alkyl, alkyloxy and nitro.

8. A polymeric dye having the formula

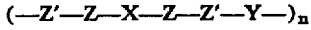

wherein $n$ is an integer from 3–5, —X— is a divalent organic radical containing a chromophore group from the class consisting of azo aromatic, azine aromatic, and anthraquinone radicals, and the combination of

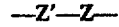

forming a urethane linkage, each Z being attached to a carbon of —X— which carbon is a component of an aromatic carbocyclic ring, —Y— being a divalent organic radical from the class consisting of —X—, aromatic, cycloaliphatic and aliphatic containing 2–10 carbon atoms, with the proviso that when —X— is

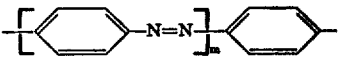

and —Y— is

$m$ being an integer of at least 1, in at least one position of 2, 3, 5, and 6 upon at least one aromatic nucleus, a hydrogen is substituted by a radical from the class consisting of alkyl, alkyloxy and nitro.

9. A polymeric dye having the formula

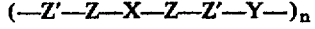

wherein $n$ is an integer from 3–5, —X— is a divalent organic radical containing a chromophore group from the class consisting of azo aromatic, azine aromatic, and anthraquinone radicals, and the combination of

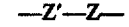

forming an amide linkage, each Z being attached to a carbon of —X— which carbon is a component of an aromatic carbocyclic ring, —Y— being a divalent organic radical from the class consisting of —X—, aromatic, cycloaliphatic and aliphatic containing 2–10 carbon atoms, with the proviso that when —X— is

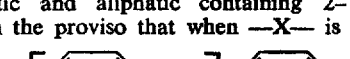

and —Y— is

$m$ being an integer of at least 1, in at least one position of 2, 3, 5, and 6 upon at least one aromatic nucleus, a hydrogen is substituted by a radical from the class consisting of alkyl, alkyloxy and nitro.

10. A polymeric dye having the formula $$(-Z'-Z-X-Z-Z'-Y-)_n$$

wherein n is an integer from 3–5, —X— is a divalent organic radical containing a chromophore group from the class consisting of azo aromatic, azine aromatic, and anthraquinone radicals, and the combination of $$-Z'-Z-$$

forming a sulfonamide linkage, each Z being attached to a carbon of —X— which carbon is a component of an aromatic carbocyclic ring, —Y— being a divalent organic radical from the class consisting of —X—, aromatic, cycloaliphatic and aliphatic containing 2–10 carbon atoms, with the proviso that when —X— is

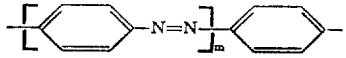

and —Y— is

m being an integer of at least 1 in at least one position of 2, 3, 5, and 6 of at least one aromatic nucleus, a hydrogen is substituted by a radical from the class consisting of alkyl, alkyloxy and nitro.

References Cited in the file of this patent
UNITED STATES PATENTS

| | | |
|---|---|---|
| 2,274,551 | Kenyon et al. | Feb. 24, 1942 |
| 2,548,376 | Jones et al. | Apr. 10, 1951 |
| 2,632,004 | Minsk et al. | Mar. 17, 1953 |
| 2,668,804 | Lantz et al. | Feb. 9, 1954 |
| 2,779,772 | Frey | Jan. 29, 1957 |
| 2,813,856 | Steinemann et al. | Nov. 19, 1957 |

UNITED STATES PATENT OFFICE
CERTIFICATE OF CORRECTION

Patent No. 2,994,693                      August 1, 1961

Norman Blake et al.

It is hereby certified that error appears in the above numbered patent requiring correction and that the said Letters Patent should read as corrected below.

Column 15, line 33, before "ring" insert --- carbocyclic ---; line 35, strike out "carbocyclic".

Signed and sealed this 1st day of May 1962.

(SEAL)
Attest:

ERNEST W. SWIDER
Attesting Officer

DAVID L. LADD
Commissioner of Patents